(12) United States Patent
Rheaume et al.

(10) Patent No.: US 10,688,440 B2
(45) Date of Patent: *Jun. 23, 2020

(54) FUEL FRACTIONING UNIT FOR INERT GAS GENERATING SYSTEM

(71) Applicant: Hamilton Sundstrand Corporation, Charlotte, NC (US)

(72) Inventors: Jonathan Rheaume, West Hartford, CT (US); Haralambos Cordatos, Colchester, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/353,356

(22) Filed: Mar. 14, 2019

(65) Prior Publication Data

US 2019/0209971 A1    Jul. 11, 2019

Related U.S. Application Data

(62) Division of application No. 15/468,888, filed on Mar. 24, 2017, now Pat. No. 10,272,390.

(51) Int. Cl.
*B01D 63/04* (2006.01)
*B01D 53/02* (2006.01)
(Continued)

(52) U.S. Cl.
CPC ........ *B01D 63/04* (2013.01); *A62D 1/0092* (2013.01); *B01D 53/02* (2013.01); *B01D 61/362* (2013.01);
(Continued)

(58) Field of Classification Search
CPC ...... B01D 63/04; B01D 53/02; B01D 61/362; B01D 63/10; B01D 71/70; B01D 53/228;
(Continued)

(56) References Cited

U.S. PATENT DOCUMENTS 3,847,298 A   11/1974  Hamilton
7,318,845 B2   1/2008  Shaaban et al.
(Continued)

FOREIGN PATENT DOCUMENTS

EP   1582504 A1   10/2005
EP   1688348 A1    8/2006
(Continued)

OTHER PUBLICATIONS

Communication Pursuant to Article 94(3) for EP Application No. 18163454.4, dated Jul. 18, 2019, 4 pages.
(Continued)

*Primary Examiner* — Andrew J. Oyer
(74) *Attorney, Agent, or Firm* — Kinney & Lange, P.A.

(57) ABSTRACT

An inert gas generating system includes a source of a liquid hydrocarbon fuel, and a fractioning unit configured to receive a portion of the liquid hydrocarbon fuel from the source. The fractioning unit includes a perm-selective membrane configured to separate the portion of the liquid hydrocarbon fuel into substantially sulfur-free vapors and a sulfur-containing remainder. The system further includes a catalytic oxidation unit configured to receive and react the substantially sulfur-free vapors to produce an inert gas.

8 Claims, 4 Drawing Sheets

(51) Int. Cl.
*B64D 45/00* (2006.01)
*B64D 37/32* (2006.01)
*C10L 1/04* (2006.01)
*A62D 1/00* (2006.01)
*B01D 71/70* (2006.01)
*B01D 63/10* (2006.01)
*B01D 61/36* (2006.01)
*B01J 31/00* (2006.01)
*B01D 63/08* (2006.01)
*B01D 63/02* (2006.01)
*B01D 53/22* (2006.01)
*C10G 7/06* (2006.01)

(52) U.S. Cl.
CPC ............. *B01D 63/10* (2013.01); *B01D 71/70* (2013.01); *B64D 37/32* (2013.01); *B64D 45/00* (2013.01); *C10L 1/04* (2013.01); *B01D 53/228* (2013.01); *B01D 63/02* (2013.01); *B01D 63/08* (2013.01); *B01J 31/00* (2013.01); *B64D 2045/009* (2013.01); *C10L 2290/543* (2013.01); *C10L 2290/544* (2013.01)

(58) Field of Classification Search
CPC ...... B01D 63/02; B01D 63/08; A62D 1/0092; C10L 1/04; C10L 2290/544; C10L 2290/543; B64D 37/32; B64D 45/00; B64D 2045/009; B01J 31/00; C10G 7/06
See application file for complete search history.

(56) References Cited

U.S. PATENT DOCUMENTS

| | | | |
|---|---|---|---|
| 7,628,965 | B2 | 12/2009 | Johnson et al. |
| 7,694,916 | B2 | 4/2010 | Limaye et al. |
| 7,735,670 | B2 | 6/2010 | Zaki et al. |
| 7,896,292 | B2 | 3/2011 | Limaye et al. |
| 7,905,259 | B2 | 3/2011 | Johnson et al. |
| 8,668,752 | B2 | 3/2014 | Scotto et al. |
| 2008/0107571 | A1* | 5/2008 | Johnson .................. C01B 32/50 422/144 |
| 2008/0128048 | A1 | 6/2008 | Johnson et al. |
| 2009/0302163 | A1 | 12/2009 | Sanford |
| 2011/0262309 | A1 | 10/2011 | Limaye et al. |
| 2012/0325811 | A1 | 12/2012 | Hagh et al. |
| 2016/0346755 | A1 | 12/2016 | DuBois |

FOREIGN PATENT DOCUMENTS

| | | |
|---|---|---|
| EP | 1688349 A1 | 8/2006 |
| WO | WO2005/063362 A1 | 7/2005 |

OTHER PUBLICATIONS

Extended European Search Report for EP Application No. 18163454.4, dated Aug. 16, 2018, 9 pages.

\* cited by examiner

FUEL FRACTIONING UNIT FOR INERT GAS GENERATING SYSTEM

CROSS-REFERENCE TO RELATED APPLICATION(S)

This application is a divisional of U.S. application Ser. No. 15/468,888 filed Mar. 24, 2017 for "FUEL FRACTIONING UNIT FOR INERT GAS GENERATING SYSTEM" by J. Rheaume and H. Cordatos.

BACKGROUND

Fuel tanks can contain potentially combustible combinations of oxygen, fuel vapors, and ignition sources. In order to prevent combustion in aircraft fuel tanks, aviation regulations require actively managing the ullage of fuel tanks, such that the oxygen partial pressure in the ullage is less than 12%. Relatedly, fire suppression systems, such as those deployed in aircraft cargo holds, use halogenated chemicals to prevent combustion and/or fire. Halogenated fire suppression agents can be safe for human exposure; however, they are known to be detrimental to the Earth's atmospheric ozone layer. Inert air can be used for fire prevention and suppression.

Currently, many On-Board Inert Gas Generation Systems (OBIGGS) use bleed air and pressurized hollow fiber membranes to produce inert gas for fuel tank ullages. In hollow fiber membranes, the diffusivity of nitrogen is less than the diffusivity of oxygen and water vapor. Hollow fiber membrane systems require pressurized air to drive the separation of nitrogen from oxygen and water vapor in an air stream. However, the pressure of bleed air extracted from an aircraft engine compressor varies throughout a mission, which affects inert gas production quantity and quality as defined by oxygen partial pressure. Furthermore, aircraft design is trending toward lower pressure bleed systems and increasingly electric power distribution architectures. Accordingly, the use of high pressure, hollow fiber membrane inerting systems can be problematic for these systems.

Other approaches utilize catalytic reactors to produce inert gas from ullage space fuel vapors, or from liquid fuel. The ullage space, however, may not always contain a sufficient amount of fuel vapors to provide for reaction. Thus, a system capable of maintaining a safe oxygen partial pressure in the ullage is necessary in order to comply with regulations requiring ullage passivation throughout the mission.

SUMMARY

An inert gas generating system includes a source of a liquid hydrocarbon fuel, and a fractioning unit configured to receive a portion of the liquid hydrocarbon fuel from the source. The fractioning unit includes a perm-selective membrane configured to separate the portion of the liquid hydrocarbon fuel into substantially sulfur-free vapors and a sulfur-containing remainder. The system further includes a catalytic oxidation unit configured to receive and react the substantially sulfur-free vapors to produce an inert gas.

A method for generating inert gas includes: providing a liquid hydrocarbon fuel to a fractioning unit, the fractioning unit having a perm-selective membrane; creating a partial pressure gradient such that a partial pressure of substantially sulfur-free vapors of the liquid hydrocarbon fuel is lower on a permeate side of the perm-selective membrane; providing an amount of the substantially sulfur-free vapors drawn through the perm-selective membrane to a catalytic oxidation unit; and reacting the amount of the substantially sulfur-free vapors to produce the inert gas.

An alternative embodiment of an inert gas generating system includes a source of liquid hydrocarbon fuel, and a fractioning unit configured to receive a portion of the liquid hydrocarbon fuel and to separate the portion of the liquid hydrocarbon fuel into substantially sulfur-free vapors and a sulfur-containing remainder. A catalytic oxidation unit is configured to receive and react the substantially sulfur-free vapors to produce the inert gas. The fractioning unit is further configured to output the sulfur-containing remainder into a return line. The return line is configured to provide the sulfur-containing remainder to a main fuel line, the main fuel line including an engine-bound fuel flow.

DETAILED DESCRIPTION

The present disclosure relates to inert gas generating systems and methods of use thereof for generating an inert gas through catalytic oxidation. A fractioning unit produces substantially sulfur-free fuel vapors to undergo catalytic oxidation. The fractioning unit is capable of operating without significant pressurized air input.

Figure 1:
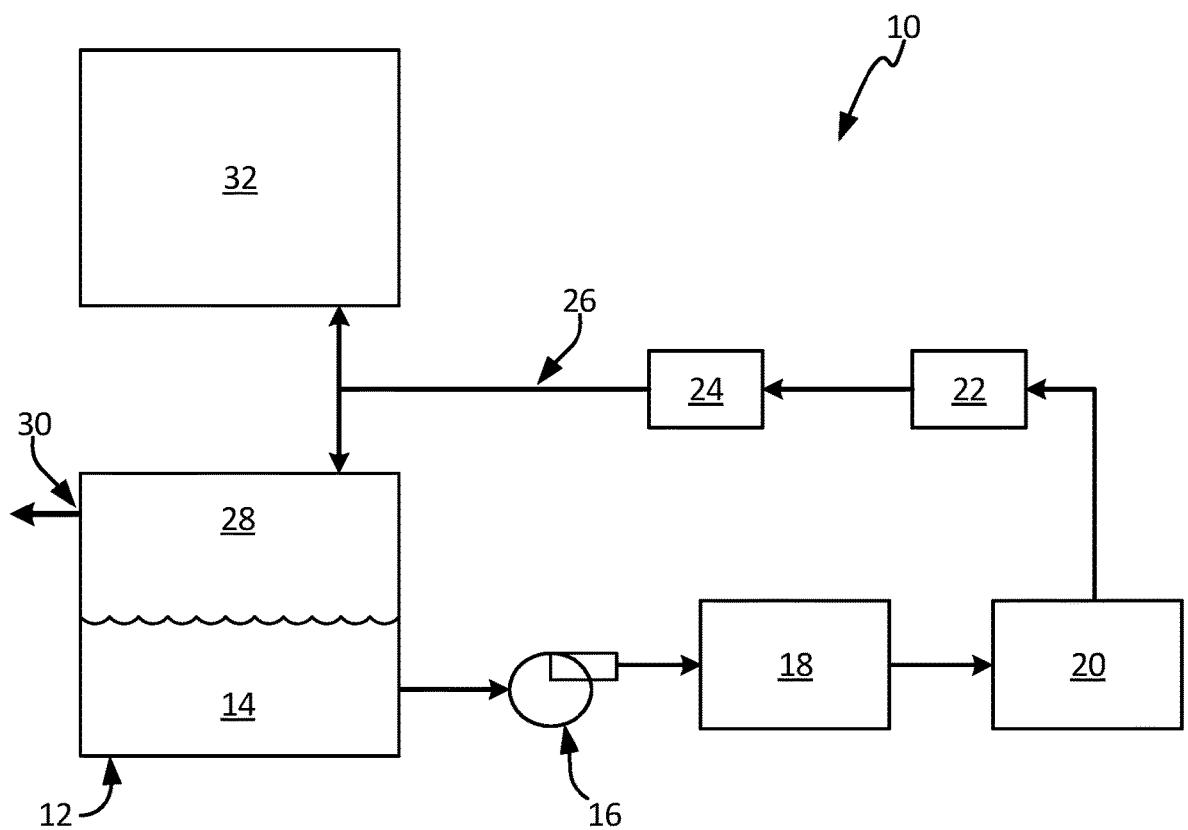
FIG. 1 is a schematic view of an inert gas generating system.

FIG. 1 is a schematic view of inert gas generating system 10. System 10 includes fuel tank 12, liquid fuel 14, fuel pump 16, fractioning unit 18, catalytic oxidation unit 20, cooling unit 22, dryer 24, passage 26, ullage space 28, vent 30 and, optionally, cargo hold 32. Fuel tank 12 provides liquid fuel 14 to fractioning unit 18 via fuel pump 16. System 10 can include one, or a plurality of fractioning units 18. Desired fuel fractions produced at fractioning unit 18 are then provided to catalytic oxidation unit 20. These hydrocarbon-rich fuel fractions are reacted in catalytic oxidation unit 20 to produce an inert gas containing primarily nitrogen, carbon dioxide and water vapor. The catalyst used in the reaction can be, for example, a noble metal, or other suitable catalyst. Cooling unit 22 and dryer 24 condition the inert gas by cooling it and removing the water vapor before its introduction to ullage space 28 via passage 26. System 10 is configured to provide the unused fuel fractions to the engines, or other locations.

Liquid fuel 14 can be a kerosene-based jet fuel, such as Jet-A, Jet-A1, or Jet-B fuel. For military applications, liquid fuel 14 can also be a jet propulsion "JP" class fuel, such as JP-5 or JP-8. Other types of fuel such as diesel, gasoline, and mixtures of fuels are also contemplated herein. In the embodiment shown, fuel tank 12 serves as the liquid fuel source, but in other embodiments, other fuel storage vessels or liquid fuel sources can be used. Similarly, fuel pump 16 is shown external to fuel tank 12 in FIG. 1, however, fuel pump 16 can also be located within fuel tank 12.

Ullage space 28—the vapor space above liquid fuel 14 within fuel tank 12—can contain potentially combustible fuel vapors. System 10 operates to reduce the risk of combustion within ullage space 28 by providing inert gas to maintain the oxygen concentration within ullage space 28 at or below 12% oxygen by volume to meet commercial aviation requirements, and below 9% for military applications.

Figure 2:
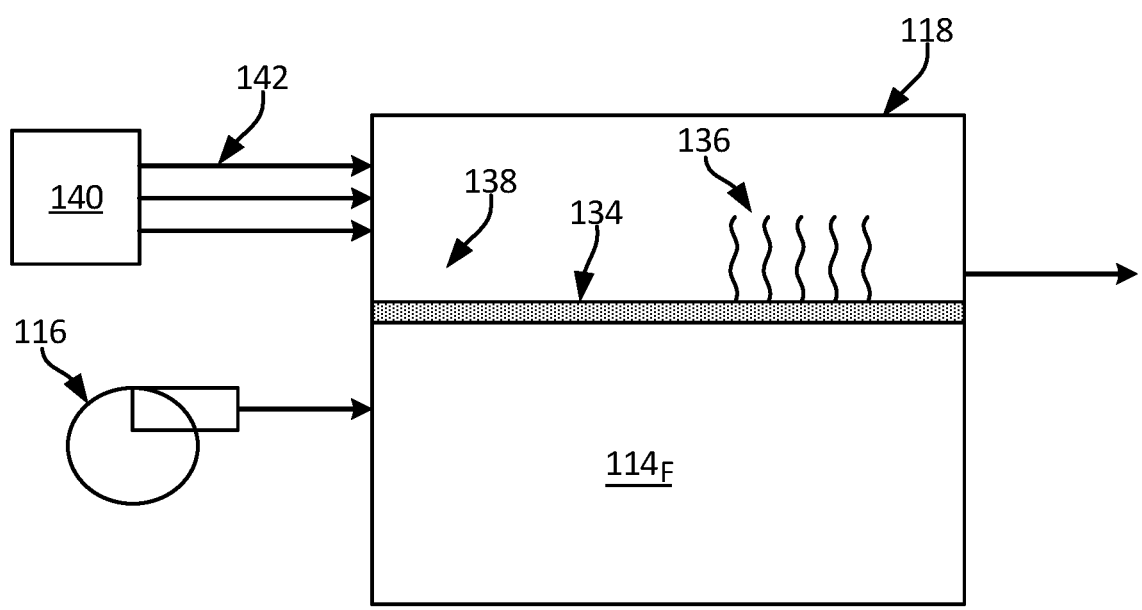
FIG. 2 is a schematic view of a fractioning unit of the inert gas generating system.

FIG. 2 is a schematic view of fractioning unit 118, which is a membrane fractioning unit. Fractioning unit 118 includes membrane 134, which is a perm-selective membrane configured to selectively permeate hydrocarbon compounds over, for example, oxygen and nitrogen. Membrane 134 can be a reverse selective membrane formed from a cross-linked silicone rubber, such as polydimethylsiloxane (PDMS). Other suitable materials can include polyoctylmethyl siloxane, polyethers (e.g., copolymers of poly(ethylene oxide) (PEO) and poly(butylene terephthalate) (PBT)), poly (4-methyl-2-pentyne), and poly-trimethyl-silyl-propyne (PTMSP). Membrane 134 can further be arranged as a plurality of hollow fibers, or can be in planar (sheet) form and have a "spiral-wound" or "plate-and-frame" configuration. Other suitable materials and configurations are contemplated herein.

In operation, liquid fuel 114 is provided to fractioning unit 118 by fuel pump 116. Liquid fuel 114 contains numerous compounds and additives, including the hydrocarbon compounds (paraffins, cycloparaffins or naphthenes, aromatics, olefins, etc.) provided for reaction within catalytic oxidation unit 20 (not shown in FIG. 2). Liquid fuel 114 can also contain sulfur compounds (sulfides, thiols, thiophenes, etc.). These compounds can poison the reaction catalyst (not shown), such that they bind to active sites on the catalyst and reduce the amount of active sites available for promoting the reaction. A majority of the sulfur within liquid fuel 114 is contained in species having large molecular diameters. Accordingly, membrane 134 is configured to disfavor by preferentially preventing passage of many sulfur-containing compounds therethrough by excluding larger, cyclic molecules, such as aromatic sulfur compounds.

The portion of liquid fuel 114 contained within fractioning unit 118 is denoted liquid fuel $114_F$ to distinguish it from liquid fuel 114 within fuel tank 112 (not shown in FIG. 2). Depending on the stage of the fractioning process, the composition of liquid fuel $114_F$ can vary from that of liquid fuel 114. For example, as the fractioning process progresses, liquid fuel $114_F$ will become enriched with sulfur compounds, as is explained in more detail below.

In order to drive permeation of hydrocarbon vapors 136 across membrane 134, the partial pressure of hydrocarbon vapors 136 should be lower on permeate side 138 of membrane 134. In the embodiment of FIG. 2, membrane fractionation is driven by a sweep gas. Air source 140 acts to generate a pressure differential by providing air stream 142—the sweep gas—to fractioning unit 118. Air source 140 can be any type of air source, for example, ambient air, ram air, fan air, engine bleed air, or cabin air with appropriate thermal regulation. Other suitable air sources are contemplated herein.

Air stream 142 flows across permeate side 138 of membrane 134. Air stream 142 does not contain hydrocarbons, so the initial partial pressure of hydrocarbon vapors 136 on permeate side 138 is zero. The partial pressure differential across membrane 134 initiates the transport of hydrocarbon vapors 136 across membrane 134. Hydrocarbon vapors 136 are substantially sulfur-free, as a majority of the sulfur remains in the heavier, unevaporated fractions of liquid fuel $114_F$. Hydrocarbon vapors 136 are subsequently provided to catalytic oxidation unit 120.

Figure 3:
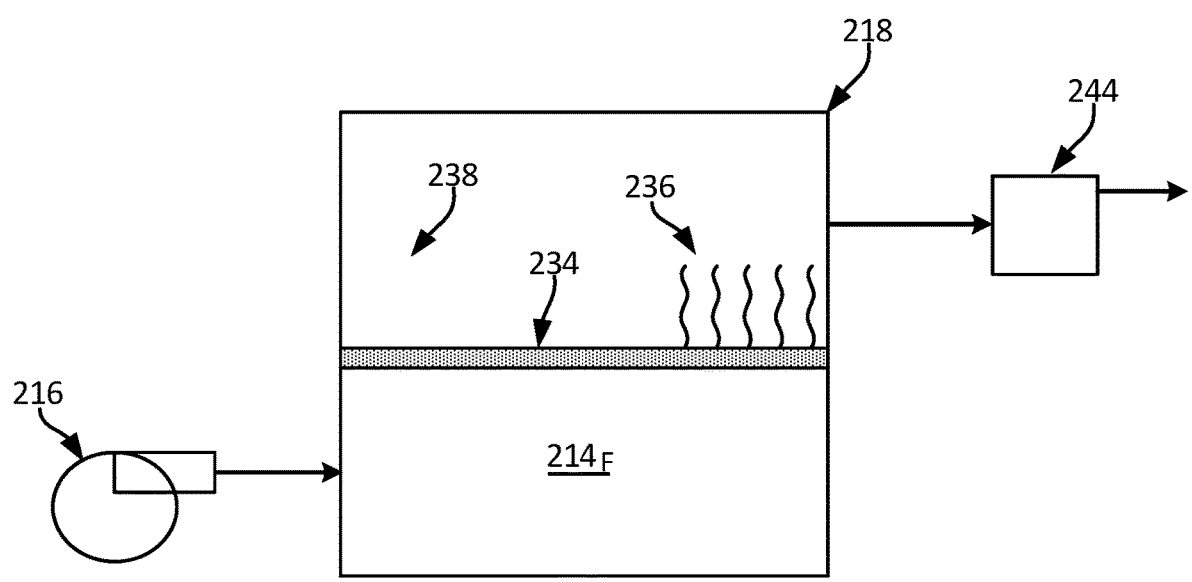
FIG. 3 is a schematic view of an alternative embodiment of the fractioning unit.

FIG. 3 is a schematic view of fractioning unit 218, which is another embodiment of a membrane fractioning unit. Fractioning unit 218 operates in the same manner as fractioning unit 118, except that the transport of hydrocarbon vapors 236 across membrane 234 is driven by vacuum source 244. Vacuum source 244 is in fluid communication with permeate side 238 of membrane 234, and is configured to generate a partial pressure differential, such that the partial pressure of hydrocarbon vapors 236 is lower on permeate side 238 of membrane 234. Vacuum source 244 can be, for example, an ejector, a diaphragm pump, other suitable pump, or combinations thereof.

In embodiments having membrane fractioning units (118, 218), system 10 can optionally include a heat source (not shown) to heat the liquid fuel (114, 214) upstream of the membrane (134, 234). The heat source can be, for example, a heating element or a recuperating heat exchanger.

In general, the production of hydrocarbon vapors from a given volume of fuel is a function of the surface area of the fuel available for evaporation, fuel temperature, and the partial pressure above the fuel. Temperature and partial pressure can vary throughout a mission, due to changes in air speed and altitude. In the embodiments of FIGS. 2 and 3, there are several ways to further regulate the amount of hydrocarbon vapors (136, 236) produced. The first is to vary the amount of liquid fuel (114, 214) provided to the fractioning unit. This can be accomplished, for example, by placing an actuated valve downstream of the fuel pump (116, 216). In the embodiment of FIG. 2, the temperature and flow rate of the sweep gas (air stream 142) can also be varied to control vapor production. For example, when air stream 142 has a higher temperature and/or a greater flow rate from air source 140, it can help generate and carry more hydrocarbon vapors 136, taking care to balance the need for fuel vapor with the stoichiometric need of oxygen for combustion.

The membrane fractioning units described above have several advantages over prior art systems. First, the configuration of the membrane provides a robust surface area on which evaporation of the liquid fuel can occur, thus allowing for a large volume of hydrocarbon vapors to be generated. The membranes are also configured to selectively permeate species having smaller molecular diameters, which facilitates the production of substantially sulfur-free vapor fractions. In other types of fractioning systems, the presence of sulfur within the vapor fractions is harder to control.

It is further possible for inert gas generating systems using membrane fractioning to be incorporated into an aircraft fuel system, such that a portion of the fuel flow to the engines can run through each fractioning unit on board. This requires that the total flow rate through the fractioning unit(s) can exceed, for example, 2,500 kg/hr, depending on engine fuel requirements during a mission. Systems using thermal fractioning, for example, would require an immense thermal input to treat such a fuel flow.

Figure 4:
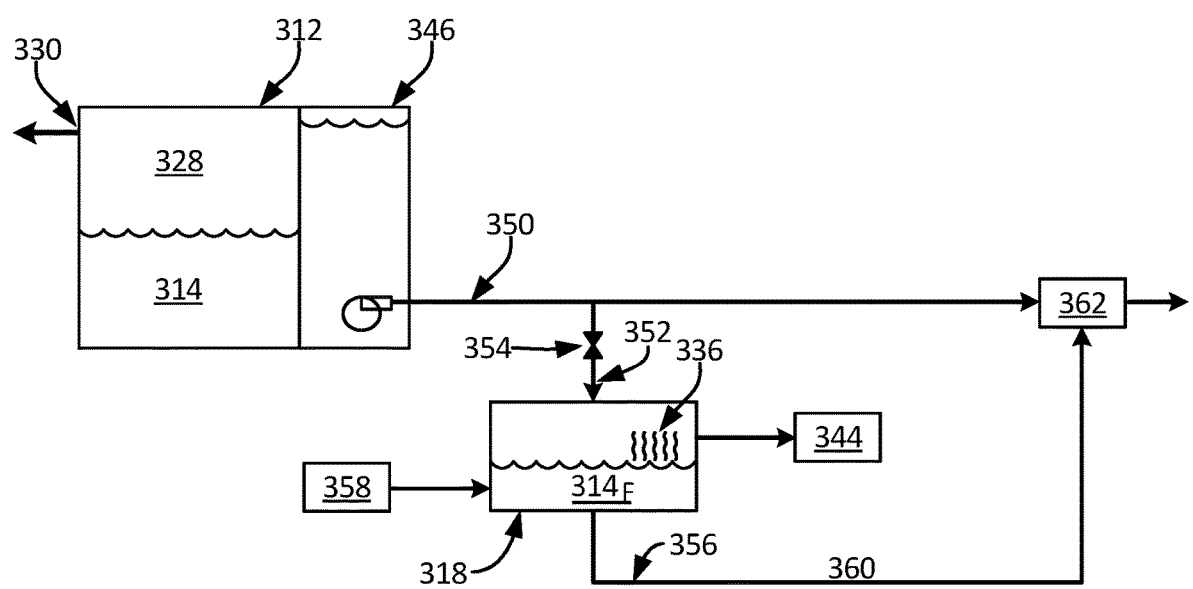
FIG. 4 is a schematic view of another alternative embodiment of the fractioning unit.

FIG. 4 is a schematic view of fractioning unit 318. Fractioning unit 318 is configured to receive liquid fuel 314 from fuel tank 312. Fuel tank 312 includes a partitioned collector cell 346, in which fuel pump 316 is located. Fuel pump 316 can be, for example, a feed pump, transfer pump, or any other suitable low-pressure pump. Fuel tank 312 also includes ullage space 328, vent 330, and scavenge pump 348.

Fractioning unit 318 is in fluid communication with fuel tank 312 via main fuel line 350 and branch line 352. Main fuel line 350 is configured to provide a fuel flow from fuel tank 312 to one or more engines. Branch line 352 is configured to provide a portion of the fuel flow to fractioning unit 318. Branch line 352 can include valve 354 to control the fuel flow into fractioning unit 318. Valve 354 can be a needle valve, or some other type of suitable, actuated valve. Valve 354 can be configured to vary the fuel flow into fractioning unit 318 according to a schedule based on mission parameters (ground, cruise, descent, etc.). Other suitable control methods (passive or active) are contemplated herein.

Fractioning unit 318 can be configured as a vacuum fractioning unit. In such an embodiment, vacuum source 344 is in communication with fractioning unit 318. Vacuum source 344 is configured to reduce the partial pressure above liquid fuel 314$_F$ to produce hydrocarbon vapors 336. Vacuum source 344 further operates to suck hydrocarbon vapors 336 out of the fractioning unit 318 to provide to catalytic oxidation unit 320 (not shown in FIG. 4). In some embodiments, vacuum source 344 can be a vacuum pump, such as a diaphragm pump, or other suitable pump. In other embodiments, vacuum source 344 can be an ejector that uses hot bleed air as a motive fluid. In other embodiments, vacuum source 344 can be a series combination of vacuum pumps or ejectors, or combinations thereof. Other suitable vacuum sources are contemplated herein. In some embodiments, fractioning unit 318 can include a demister (not shown) upstream of vacuum source 344 to capture droplets of liquid fuel 314$_F$ and prevent them from entering catalytic oxidation unit 320.

Fractioning unit 318 can also be in communication with heat source 358, which is used to heat and thereby improve the transport properties of liquid fuel 314$_F$ within fractioning unit 318. In some embodiments, heat source 358 is used in conjunction with vacuum source 344 to facilitate the production of hydrocarbon vapors 336. Fractioning unit 318 can also be configured as a thermal fractioning unit, and rely solely on heat source 358 to produce hydrocarbon vapors 336. In the embodiment shown, heat source 358 is a heating element in thermal communication with fractioning unit 318. In other embodiments, heat source 358 can be a heat exchanger with a heat source such as bleed air, hot engine oil, hot fuel, or hot inert gas generated by the catalytic oxidation process. The heat sink for the heat exchanger can be liquid fuel 314$_F$ in fractioning unit 318 or liquid fuel 314 bound for fractioning unit 318. This invention additionally envisions any other suitable heat source.

Heat source 358 can be in communication with fractioning unit 318 in the manner shown in FIG. 4, to heat liquid fuel 314$_F$ within fractioning unit 318. It can also be located, for example, along branch line 352 to heat liquid fuel 314 as it enters fractioning unit 318. Other locations suitable for heating liquid fuel 314/314$_F$ or other components of fractioning unit 318 are contemplated herein.

Whether configured as a vacuum or thermal fractioning unit, fractioning unit 318 produces substantially sulfur-free hydrocarbon vapors 336, because both methods generally separate vapor components by boiling point. Sulfur-containing compounds generally have higher boiling points than many of the hydrocarbon compounds within liquid fuel 314 (hexane, benzene, cyclohexane, etc.), so sulfur-containing compounds tend not to evaporate with the hydrocarbon compounds. In other embodiments, fractioning unit 318 can include a membrane 334 (not shown) that operates to produce hydrocarbon vapors 336 in the same manner as membranes 134 and 234.

Fractioning unit 318 is in communication with return line 356. Return line 356 is configured to receive the unevaporated, sulfur-containing remainder 360 of liquid fuel 314$_F$ from fractioning unit 318, and provide remainder 360 to main fuel line 350. Return pump 362 is downstream of fractioning unit 318 along return line 356. Return pump 362 is configured to provide remainder 360 to main fuel line 350 at a suitable pressure. Return pump 362 can be an ejector, or other suitable pump. Remainder 360 can be joined with engine-bound liquid fuel 314 from fuel tank 312 at main line 350.

Fractioning unit 318 has several advantages over prior art systems Like membrane fractioning units 118 and 218, fractioning unit 318 is configured to produce substantially sulfur-free hydrocarbon vapors, which helps mitigate catalyst poisoning. Fractioning unit 318 also provides a method for releasing the sulfur-containing remainder, which helps prevent a buildup of sulfur-containing residual fractions within fractioning unit 318. Providing the remainder for engine consumption is also beneficial because it ensures that the unused remainder is not wasted. Further, the remainder can be quite hot after leaving fractioning unit 318, so returning it to, for example, fuel tank 312, is undesirable, as it heats the bulk fuel. In addition, the return of sulfur-containing fuel to a fuel tank undesirably concentrates sulfur in the tank, which may lead to higher rates of corrosion.

The various embodiments of system 10 can be used for other aircraft applications, such as cargo hold fire suppression. Current systems employ Halon 1301, a capable fire suppressant also known to be detrimental to the environment. Inert gas produced by system 10 can therefore be used to reduce or eliminate the amount of Halon 1301 used in these systems. For example, in addition to/instead of being sent to ullage space 28, inert gas can be routed to cargo hold 32 (shown in FIG. 1).

System 10 can be used to provide inert gas for fuel sparging. That is, inert gas can be bubbled through the liquid fuel to reduce the amount of dissolved oxygen and other impurities within the fuel. Sparging has the dual benefit of stabilizing the fuel for use as a heat sink and passivating the ullage space.

System 10 can also be used in non-aviation applications. For example, system 10 can be used in maritime vessels for purging and inerting storage tanks for crude oil, natural gas, product hydrocarbons, and vehicle fuel. System 10 can also be used in the automotive or other industries having a need for inert gas.

Discussion of Possible Embodiments

The following are non-exclusive descriptions of possible embodiments of the present invention.

An inert gas generating system includes a source of a liquid hydrocarbon fuel, and a fractioning unit configured to receive a portion of the liquid hydrocarbon fuel from the source. The fractioning unit includes a perm-selective membrane configured to separate the portion of the liquid hydrocarbon fuel into substantially sulfur-free vapors and a sulfur-containing remainder. The system further includes a catalytic oxidation unit configured to receive and react the substantially sulfur-free vapors to produce an inert gas.

The system of the preceding paragraph can optionally include, additionally and/or alternatively, any one or more of the following features, configurations and/or additional components:

A pressure differential generator is in fluid communication with a permeate side of the perm-selective membrane, and is configured to create a partial pressure gradient across the perm-selective membrane.

The partial pressure generator is an air source configured to provide an air stream.

The air stream is selected from the group consisting of ambient air, fan air, engine bleed air, cabin air, and combinations thereof.

The pressure differential generator is a vacuum source.

A fuel pump is configured to provide the liquid hydrocarbon fuel to the fractioning unit.

The perm-selective membrane is a reverse selective membrane and includes a plurality of hollow fibers.

The perm-selective membrane is a reverse selective membrane in planar form having a spiral-wound or plate-and-frame configuration.

The perm-selective membrane is a silicone-based material.

A passageway is configured to provide the inert gas to a defined space.

The defined space is a fuel tank or a cargo hold.

The fractioning unit is configured to provide the sulfur-containing remainder to a main fuel line, and the main fuel line comprises an engine-bound fuel flow.

A method for generating inert gas includes: providing a liquid hydrocarbon fuel to a fractioning unit, the fractioning unit having a perm-selective membrane; creating a partial pressure gradient such that a partial pressure of substantially sulfur-free vapors of the liquid hydrocarbon fuel is lower on a permeate side of the perm-selective membrane; providing an amount of the substantially sulfur-free vapors drawn through the perm-selective membrane to a catalytic oxidation unit; and reacting the amount of the substantially sulfur-free vapors to produce the inert gas.

The method of the preceding paragraph can optionally include, additionally and/or alternatively, any one or more of the following features, configurations and/or additional components:

Generating the partial pressure gradient includes flowing an air stream over the permeate side of the perm-selective membrane.

Generating the partial pressure gradient comprises operating a vacuum source in fluid communication with the permeate side of the perm-selective membrane.

An alternative embodiment of an inert gas generating system includes a source of liquid hydrocarbon fuel, and a fractioning unit configured to receive a portion of the liquid hydrocarbon fuel and to separate the portion of the liquid hydrocarbon fuel into substantially sulfur-free vapors and a sulfur-containing remainder. A catalytic oxidation unit is configured to receive and react the substantially sulfur-free vapors to produce the inert gas. The fractioning unit is further configured to output the sulfur-containing remainder into a return line. The return line is configured to provide the sulfur-containing remainder to a main fuel line, the main fuel line including an engine-bound fuel flow.

The system of the preceding paragraph can optionally include, additionally and/or alternatively, any one or more of the following features, configurations and/or additional components:

A heat source is configured to elevate a temperature of the portion of the liquid hydrocarbon fuel.

A vacuum source is in communication with the fractioning unit, and the vacuum source is configured to reduce a partial pressure of the portion of the liquid hydrocarbon fuel.

The vacuum source is one of a vacuum pump or an ejector.

The fractioning unit further includes a perm-selective membrane, and the membrane is configured to selectively permeate the substantially sulfur-free vapors.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An inert gas generating system comprising:
    a source of a liquid hydrocarbon fuel;
    a fractioning unit configured to receive a portion of the liquid hydrocarbon fuel, wherein the fractioning unit is further configured to separate the portion of the liquid hydrocarbon fuel into substantially sulfur-free vapors and a sulfur-containing remainder;
    a vacuum source in communication with the fractioning unit, wherein the vacuum source is configured to reduce a partial pressure of the portion of the liquid hydrocarbon fuel; and
    a catalytic oxidation unit configured to receive and react the substantially sulfur-free vapors to produce the inert gas;
    wherein the fractioning unit is further configured to output the sulfur-containing remainder into a return fuel line;
    wherein the return fuel line is configured to provide the sulfur-containing remainder to a main fuel line, the main fuel line comprising an engine-bound fuel flow.

2. The system of claim 1 further comprising: a heat source configured to heat the portion of the liquid hydrocarbon fuel.

3. The system of claim 2, wherein the heat source is a heat exchanger in thermal communication with one of an amount of bleed air, engine oil, liquid hydrocarbon fuel, and inert gas.

4. The system of claim 1, wherein the vacuum source is one of a vacuum pump and an ejector.

5. The system of claim 1, wherein the fractioning unit further comprises a perm-selective membrane, and wherein the membrane is configured to selectively permeate the substantially sulfur-free vapors.

6. The system of claim 1, wherein the source of the liquid hydrocarbon fuel is a partitioned collector cell of an aircraft fuel tank.

7. The system of claim 1, wherein a valve selectively controls the portion of the liquid hydrocarbon fuel received by the fractioning unit.

8. The system of claim 7, wherein the valve is configured to control the portion of the liquid hydrocarbon fuel received by the fractioning unit based on at least one aircraft flight parameter.

* * * * *